United States Patent
Noetzel et al.

(10) Patent No.: US 8,043,758 B2
(45) Date of Patent: Oct. 25, 2011

(54) METHOD AND APPARATUS FOR CONTROLLING A FUEL CELL SYSTEM

(75) Inventors: John G. Noetzel, Fairport, NY (US); Karl J. Haltiner, Jr., Fairport, NY (US); Kaushik Rajashekara, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 629 days.

(21) Appl. No.: 11/266,987

(22) Filed: Nov. 4, 2005

(65) Prior Publication Data

US 2006/0057442 A1    Mar. 16, 2006

Related U.S. Application Data

(62) Division of application No. 10/178,281, filed on Jun. 24, 2002, now Pat. No. 6,989,211.

(51) Int. Cl.
*H01M 8/00* (2006.01)
*H01M 8/04* (2006.01)

(52) U.S. Cl. ........ 429/442; 429/429; 429/430; 429/431; 429/432; 429/900

(58) Field of Classification Search .............. None
See application file for complete search history.

(56) References Cited

U.S. PATENT DOCUMENTS

| | | | | |
|---|---|---|---|---|
| 5,156,928 A | * | 10/1992 | Takabayashi | 429/23 |
| 6,093,500 A | * | 7/2000 | Margiott et al. | 429/13 |
| 6,096,449 A | * | 8/2000 | Fuglevand et al. | 429/13 |
| 6,229,289 B1 | * | 5/2001 | Piovaccari et al. | 323/268 |
| 2002/0163819 A1 | * | 11/2002 | Treece | 363/34 |
| 2003/0091882 A1 | * | 5/2003 | Schmidt et al. | 429/23 |

* cited by examiner

*Primary Examiner* — Robert Hodge
(74) *Attorney, Agent, or Firm* — Thomas N. Twomey

(57) ABSTRACT

A method of operating a fuel cell includes the step of selectively connecting and disconnecting the fuel cell to at least one electrical load dependent at least in part upon at least one of a fuel cell voltage, a fuel cell current and a fuel cell temperature.

14 Claims, 2 Drawing Sheets

METHOD AND APPARATUS FOR CONTROLLING A FUEL CELL SYSTEM

This is a division of application Ser No. 10/178,281 filed on Jun. 24, 2002.

TECHNICAL FIELD

The present invention relates to fuel cells.

BACKGROUND OF THE INVENTION

Automobiles emit hydrocarbons, nitrogen oxides, carbon monoxide and carbon dioxide as a result of the combustion process. Automobile emissions are said to be a significant contributor to pollution. In order to reduce and/or eliminate such emissions automobile manufacturers have attempted to utilize alternative transportation fuels and/or alternative sources of power, such as, for example, fuel cells. Generally, fuel cells generate electricity by electrochemically combining across an ion-conducting electrolyte a fuel, such as hydrogen, carbon monoxide, or a hydrocarbon, and an oxidant, such as air or oxygen.

A fuel cell system typically includes a "stack" of individual fuel cells that are electrically interconnected in a series configuration. Thus, the number of cells in the stack, i.e., the number of cells connected together in series, determines the voltage that is produced by the stack. Each of the individual fuel cells within the stack produces a voltage that varies dependent at least in part upon the current being drawn from that cell and/or the stack. The voltage produced by a typical single cell varies from an open circuit voltage, such as, for example, approximately 1.0 Volts (V) at low or zero current loads to a lower limit, such as, for example, approximately 0.7 V, under high current loads. If the voltage produced by a cell drops below a minimum threshold, such as, for example, 0.6 V, an undervoltage condition exists that may result in damage to the cell, such as, for example, cell oxidation.

Since the voltage produced by each cell varies dependent at least in part upon the current load upon the cell, the voltage produced by the stack also varies dependent at least in part upon the current load. More particularly, due to the series interconnection of the cells in the stack, the variation in the voltage produced by the cells is cumulative, i.e., the stack voltage will vary in a manner that reflects the sum of the voltage variations of the individual cells within the stack. This cumulative effect on the stack voltage can be relatively substantial. For example, the voltage produced by a fuel cell having sixty cells may vary from approximately sixty volts to approximately forty-two volts.

Most electrical systems are designed to operate with a supply voltage that falls within a predetermined range. As described above, the voltage produced by a fuel cell stack may vary substantially. Thus, if a fuel cell system is to be used as a power source for such an electrical system the stack voltage must typically be regulated by a voltage regulating device or devices to ensure the stack voltage supplied to the electrical system remains within the voltage range required by the electrical system, independent of the voltage produced by the stack. As the amount of variation in the voltage produced by the stack increases a correspondingly greater amount of regulation is required in order to provide a supply voltage to the electrical system that is within the specified range. In order to provide adequate regulation of such a widely-varying voltage, voltage regulation or control devices that are relatively complex, costly, sizeable, and power consuming are required.

Therefore, what is needed in the art is a fuel cell system that substantially reduces damage and/or oxidation to the cells, such as, for example, due to an under voltage condition.

Furthermore, what is needed in the art is a method and apparatus that controls the output voltage of a fuel cell system while also controlling the operation of the fuel cell such that the fuel cell operates with improved efficiency relative to unregulated operation.

Moreover, what is needed in the art is a fuel cell system that generates a controlled and/or regulated output voltage.

SUMMARY OF THE INVENTION

The present invention provides a method and apparatus for controlling the operation of a fuel cell system.

The present invention comprises, in one form thereof, the step of selectively connecting and disconnecting the fuel cell to at least one electrical load dependent at least in part upon at least one of a fuel cell voltage, a fuel cell current and a fuel cell temperature. The invention further comprises, in one form thereof, a fuel cell unit having a fuel cell stack producing a fuel cell voltage and a fuel cell current. A power conditioner electrically connected to the fuel cell unit includes a power switching device. The power switching device selectively connects and disconnects the fuel cell voltage to at least one load dependent at least in part upon an operating temperature of the fuel cell stack, the fuel cell voltage, and the fuel cell current to thereby produce an output voltage.

An advantage of the present invention is that the potential of damage and/or oxidation of the cells, such as, for example, due to an under voltage condition, is substantially reduced.

Another advantage of the present invention is the output voltage of the fuel cell system is controlled while the operation of the fuel cell is also controlled such that the fuel cell operates with improved efficiency relative to unregulated operation.

A further advantage of the present invention is the output voltage generated is substantially controlled and/or regulated.

BRIEF DESCRIPTION OF THE DRAWINGS

The above-mentioned and other features and advantages of this invention, and the manner of attaining them, will become apparent and be more completely understood by reference to the following description of one embodiment of the invention when read in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
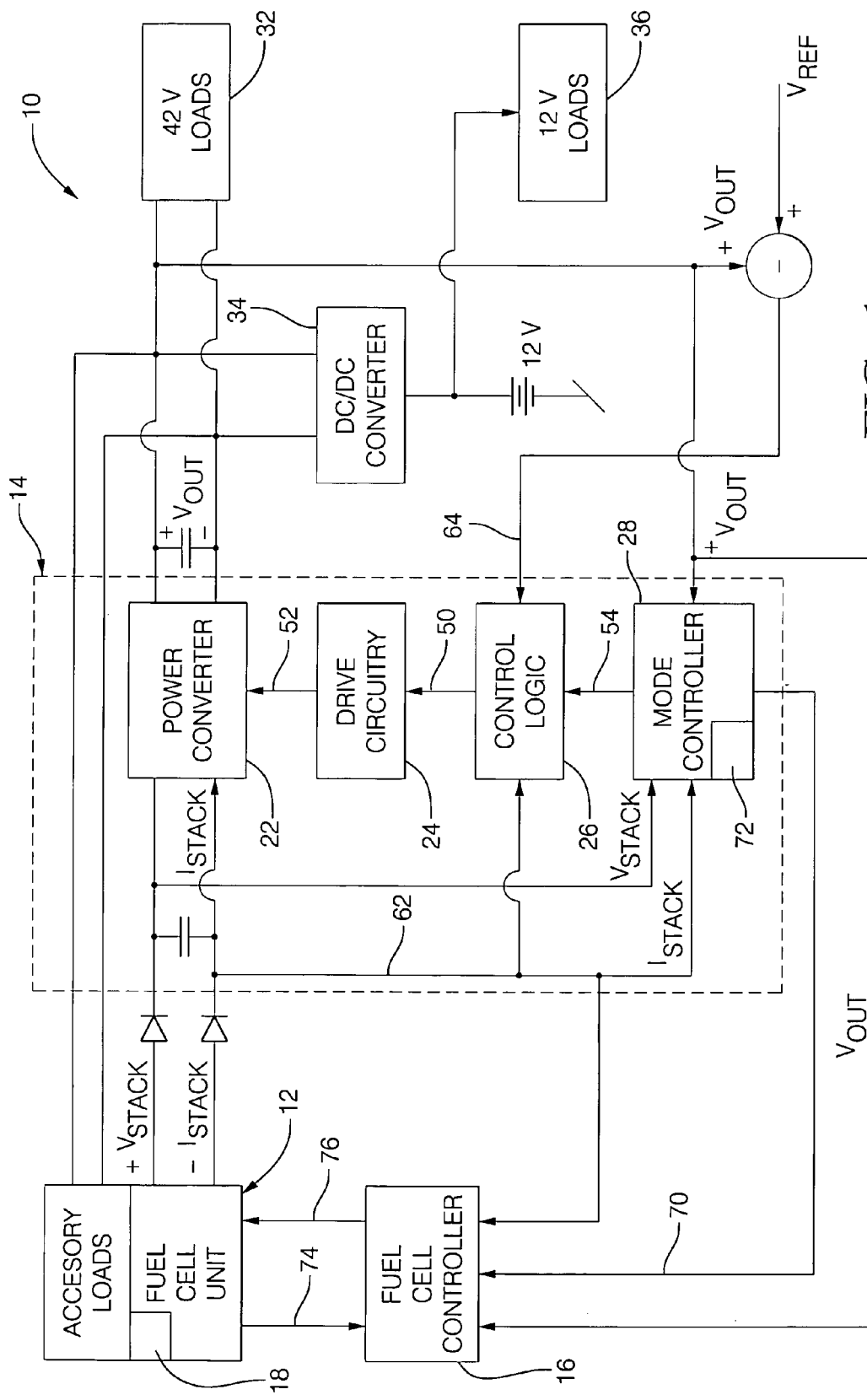
FIG. 1 is a schematic block diagram of one embodiment of a fuel cell system of the present invention.

Referring now to the drawings, and particularly to FIG. 1, there is shown one embodiment of a fuel cell system of the present invention. Fuel cell system 10 includes fuel cell unit 12, power conditioner 14 and fuel cell controller 16.

Fuel cell unit 12 includes a conventional fuel cell stack 18 constructed of a plurality of individual fuel cells (not shown), such as, for example, solid oxide fuel cells (SOFC), that are electrically interconnected in series. Fuel cell unit 12 also includes associated components, such as, for example, at least one reformer, waste energy recovery system and conduits interconnecting the components to each other and with supplies of fuel and/or air, etc (none of which are shown). Fuel cell unit 12 generates a substantially unregulated output voltage $V_{STACK}$ and output current $I_{STACK}$.

Power conditioner 14, in general, controls and/or conditions the voltage produced by fuel cell unit 12 to remain within a desired or predetermined voltage, and ensures fuel cell unit 12 is operated in a relatively efficient manner in each of the several operating modes thereof. Power conditioner 14 includes power converter circuitry 22, gate drive circuitry 24, control logic 26, and mode controller 28.

Figure 2:
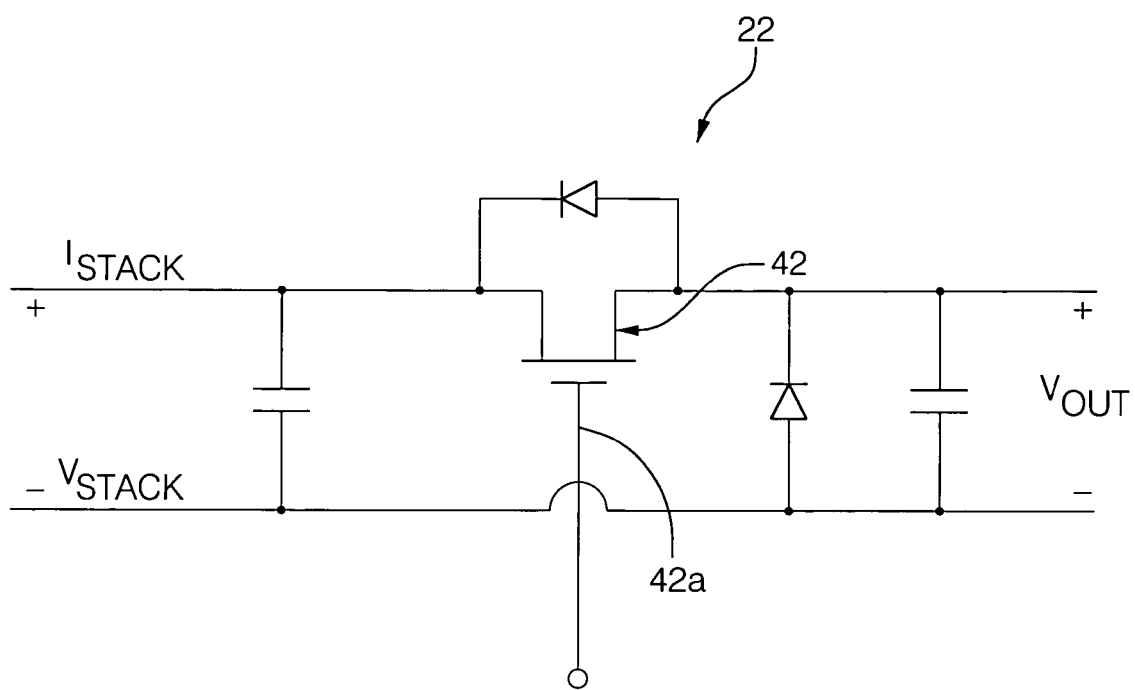
FIG. 2 is a schematic diagram of the power converter of FIG. 1.

Converter circuitry 22 is electrically interconnected with fuel cell unit 12, and receives therefrom $V_{STACK}$ and $I_{STACK}$. Converter circuitry 22 is also electrically interconnected with external load 32, such as, for example, one or more forty-two Volt loads. Converter circuitry 22 is further electrically connected, via DC/DC converter 34, to external load 36, such as, for example, one or more twelve Volt loads. Generally, converter circuitry 22 supplies voltage $V_{OUT}$ to external load 32 and DC/DC converter 34. A schematic of an exemplary converter circuit 22 is shown in FIG. 2.

Converter circuitry 22 includes at least one power switching device 42 (FIG. 2), such as, for example, one or more power metal oxide semiconductor field effect transistors (MOSFETs), integrated gate bipolar transistors (IGBTs) or other suitable power switching devices. Power switching device 42 is electrically connected between fuel cell unit 12 and each of load 32 and DC/DC converter 34. Generally, power switching device 42 controls the current flowing from fuel cell unit 12 to load 32 and to DC/DC converter 34. Power switching device 42 is operated in one of three modes dependent at least in part upon the signal applied to control terminal 42a, such as, for example, the gate, thereof. In a current blocking mode, such as, for example, an open-circuit mode, power switching device 42 disallows substantially all current flow from fuel cell unit 12, thereby enabling fuel cell unit 12 to operate in a substantially unloaded condition. In another or a first mode of operation, such as, for example, a pulse-width modulated mode, power switching device 42 is operated in such a manner that the value of $V_{OUT}$ is maintained within a predetermined voltage range. In yet another or second mode of operation, such as, for example, a linear mode, power switching device 42 is operated as a series pass through device to thereby maintain the value of $V_{OUT}$ within a predetermined voltage range.

Converter circuitry 22 may be configured as a single power switching device 42 interconnected between fuel cell unit 12 and issuing $V_{OUT}$ to external loads. Preferably, however, converter circuitry 22 is configured as a conventional linear regulator integrated circuit, such as, for example, model number 1802 manufactured by Unitrode Corporation of Merrimack, N.H., model number MC78BC30 manufactured by ON Semiconductor Corporation of Phoenix, Ariz., or model number LM1723 manufactured from ON Semiconductor Corporation, that integrates onto a single chip/integrated circuit the unreferenced components, such as the diodes, capacitors, inductors, etc., shown in FIG. 2.

Gate drive circuitry 24, in general, interfaces control logic 26 with power converter circuitry 22 thereby enabling signals from control logic 26 to drive power converter circuitry 22. More particularly, drive circuitry 24 is electrically connected to and receives control signal 50 from control logic circuitry 26, and is electrically connected and issues drive signal 52 to power converter circuitry 22. Drive signal 52 is dependent at least in part upon control signal 50. Drive signal 52 is electrically connected to and received by control terminal 42a of power switching device 42. Thus, the mode in which power switching device 42 is operating is dependent at least in part upon drive signal 52. Gate drive circuitry 24 is configured as a conventional gate drive circuit, such as, for example, model numbers IR2110 or IR2125 manufactured by International Rectifier Corporation of El Segundo, Calif.

Control logic 26 is electrically connected to gate drive circuit 24 and to mode controller 28. Control logic 26 issues control signal 50 to drive circuitry 24, and receives converter mode signal 54 from mode controller 28. Control logic 26 also receives current signal 62 and voltage error signal 64. Current signal 62 is indicative of the current being supplied by fuel cell unit 12, i.e., $I_{STACK}$, and voltage error signal 64 is indicative of the difference between $V_{OUT}$ and a reference voltage $V_{REF}$, as determined by, for example, a comparator (not referenced). Dependent at least in part upon converter mode signal 54, current signal 62 and voltage error signal 64, control logic circuitry 26 issues control signal 50 to drive circuitry 24. Control logic circuitry 26 is configured as a conventional pulse-width modulation switching and control logic circuit, such as, for example, model numbers 1802 or 1526A manufactured by Unitrode Corporation of Merrimack, N.H.

Mode controller 28, as is described more particularly hereinafter, determines the mode in which power conditioner 14 and fuel cell unit 12 operate in order to maintain efficient operation and/or increase the efficiency thereof. Mode controller 28 receives and monitors the output voltage $V_{OUT}$ of power conditioner 14. Mode controller 28 also receives $V_{STACK}$ and current signal 62, which is indicative of $I_{STACK}$. Mode controller 28 issues converter mode signal 54 which is indicative of the operational mode that is most efficient given the operating conditions and parameters of fuel cell unit 12 and power conditioner 14. Mode controller 28 issues to fuel cell controller 16 a cell operational control signal 70, which is indicative of any adjustments necessary to the output, such as, for example, $I_{STACK}$ and $V_{STACK}$, of fuel cell unit 12 in light of instantaneous operating conditions and parameters. Mode controller 28 is configured as one or more logic gates, such as, for example, AND, OR and/or NAND gates. Preferably, mode controller 28 is configured as a microprocessor executing mode control software 72.

Fuel cell controller 16, such as, for example, a microprocessor-based control unit, controls the operation of fuel cell unit 12 dependent at least in part upon stack signals 74, such as, for example, sensor signals, indicative of the operating conditions and parameters, such as, for example, the amount of reformate flow, operating temperature, etc, of fuel cell unit 12. Fuel cell controller 16 also receives cell operational control signal 70 from, mode controller 28, receives $V_{OUT}$ and $I_{STACK}$ signal 62. Fuel cell controller 16 controls the operation of fuel cell unit 12 by issuing stack control signals 76 that are dependent at least in part upon stack signals 74, cell operational control signal 70, $V_{OUT}$ and $I_{STACK}$ signal 62 to adjust the operational parameters, such as, for example, reformate and air flow, to thereby adjust and/or control the operation of fuel cell unit 12.

In use, fuel cell system 10 supplies output voltage $V_{OUT}$ to loads 32 and 36. More particularly, power conditioner 14 in conjunction with fuel cell controller 16 control the operation of fuel cell unit 12 and maintain $V_{OUT}$ within a predetermined and desired voltage range, thereby rendering fuel cell system 10 suitable for use as a power source for a variety of electrical systems, such as, for example, an electrical system of a motor vehicle.

Fuel cell unit 12 has three general modes of operation, i.e., start-up, operating, and cool down modes. During the start-up mode of operation, the fuel cell unit 12 has not reached its intended operational temperature. Accordingly, current $I_{STACK}$ is substantially lower than a predetermined or nominal value. The difference between the start-up value of $I_{STACK}$ and the nominal value of $I_{STACK}$ is detected by mode controller 28, which, in turn, issues mode signal 54 to control logic 26. Control logic 26 decodes mode signal 54 and, dependent at least in part thereon, issues control signal 50 to gate drive circuitry 24. Gate drive circuitry 24, dependent at least in part upon control signal 50, issues drive signal 52. Drive signal 52 is received by power converter circuitry 22 and, more particularly, the control terminal of power switching device 42.

Drive signal 52, when fuel cell unit 12 is operating in the start-up mode, places power switching device 42 into a corresponding start-up mode, such as, for example, substantially an open circuit, wherein current flow from fuel cell unit 12 to loads 32 and 36 is substantially disallowed or precluded. By disallowing current flow from fuel cell unit 12, power conditioner 14 enables fuel cell 12 to operate at the open circuit voltage, thereby reducing the duration of time fuel cell unit 12 operates in the start-up mode. Thus, power conditioner 14 expedites fuel cell unit 12 reaching its operating temperature and entering the operating mode.

When fuel cell unit 12 reaches a predetermined minimum start-up or warm-up temperature, the value of $I_{STACK}$ has increased and reached a predetermined start-up value. This increase in $I_{STACK}$ is detected and recognized by mode controller 28 of power conditioner 14 which, in response to $I_{STACK}$ exceeding the predetermined threshold, issues an updated mode control signal 54. Control logic circuitry 26 decodes the revised mode control signal 54 and, in turn, issues control signal 50 to gate drive circuitry 24. In response to the revised control signal 50, gate drive circuitry 24 issues drive signal 52 that places power switching device 42 in a condition that allows a predetermined and relatively small amount of current $I_{STACK}$ to flow from fuel cell unit 12 through to loads 32 and 36 (i.e., a current-limiting mode). This relatively small flow of $I_{STACK}$ enhances the pre-heating of fuel cell unit 12 and fuel cell stack 18 due to the chemical conversion therein of reformate and air to electricity, and thereby reduces the amount of time required for fuel cell unit 12 to reach its operating or use temperature.

Once fuel cell unit 12 reaches its operating or use temperature, fuel cell unit 12 exits the start-up mode and enters the operating mode. The readiness of fuel cell unit 12 to enter the operating mode is detected by mode controller 28, through the monitoring of $I_{STACK}$ and $V_{STACK}$, which alters mode signal 54 accordingly. Control logic circuitry 26 decodes mode signal 54 and issues a corresponding control signal 50 to gate drive circuitry 24. Gate drive circuitry 24 issues a corresponding drive signal 52 to power converter 22 thereby causing power switching device 42 to operate in an appropriate one of the first or second modes of operation (i.e., the pulse-width modulated mode or the linear mode), typically the first or PWM mode of operation, as described above.

During shut down of fuel cell system 10, the values of $V_{STACK}$ and $I_{STACK}$ being drawn from fuel cell unit 12 are substantially reduced relative to the warm-up and operating modes. Mode controller 28 detects this shut down condition and issues a corresponding mode signal 54 to control logic 26. Control logic 26 decodes mode signal 54 and, dependent at least in part thereon, issues control signal 50 to gate drive circuitry 24. Gate drive circuitry 24, in turn, issues drive signal 52. Drive signal 52 is received by power converter circuitry 22 thereby causing power switching device to enter the current blocking or open-circuit operating mode. With power switching device 42 in the current blocking mode, substantially no current flows from fuel cell unit 12 to loads 32 or 36 thereby ceasing the heat-emitting reaction within fuel cell stack 18 and expediting the cooling and/or shut down process thereof.

With fuel cell unit 12 in the operating or use mode, i.e., fuel cell unit 12 has reached its operating or use temperature, mode controller 28 monitors the difference between $V_{STACK}$ and $V_{OUT}$ in order to determine the most efficient operating mode of power converter 14 and fuel cell unit 12. As described above, with fuel cell unit 12 in the operating mode power conditioner 14 operates in a first or pulse-width modulated mode when the difference between stack voltage $V_{STACK}$ and $V_{OUT}$ is relatively large, such as, for example, greater than approximately 3.0 V. Power switching device 42 is placed into the first mode of operation through the application of a corresponding drive signal 52, such as, for example, a pulse-width modulated (PWM) signal. $V_{STACK}$ is controlled by controlling and/or adjusting the duty cycle of the pulse-width modulated drive signal 52. Conversely, power conditioner 14 operates in a second or linear mode when the difference between stack voltage $V_{STACK}$ and $V_{OUT}$ is relatively small, such as, for example, less than approximately 3.0 V, and when $V_{STACK}$ is less than the desired nominal output voltage, such as, for example, approximately 42 V. Power switching device 42 is placed into the second mode through a corresponding drive signal 52, such as, for example, a voltage level sufficient to bias power switching device 42 into the linear region of operation. In the linear region, power switching device 42 dissipates a relatively low amount of power and therefore operates in a relatively efficient manner.

It should be particularly noted that mode controller 28 monitors $V_{STACK}$, $I_{STACK}$ and $V_{OUT}$ to detect start-up, over load and short circuit conditions. When fuel cell unit 12 is operating under any one of those conditions, mode controller 28 controls $I_{STACK}$ via power switching device 42. By controlling the amount of current $I_{STACK}$ being drawn from fuel cell unit 12, mode controller 28 indirectly controls the reformate flow through fuel cell unit 12, and thereby substantially protects fuel cell unit 12 from damage.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A fuel cell system, comprising:
   a fuel cell unit having a fuel cell stack, said fuel cell stack producing a fuel cell voltage and a fuel cell current;
   a power conditioner electrically connected to said fuel cell unit and producing an output voltage, said power conditioner including a power switching device, said power switching device selectively connecting and disconnecting said output voltage to a plurality of loads dependent at least in part upon an operating temperature of said fuel cell stack to thereby produce said output voltage to be different in voltage than said fuel cell voltage, wherein when said fuel cell stack is producing said fuel cell voltage in a start-up mode said power switching device is configured for disallowing substantially all of said fuel cell current from said fuel cell stack to said plurality of loads when said fuel cell stack is below said operating temperature.

2. The fuel cell system of claim 1, wherein said power conditioner further comprises a mode controller, said mode controller electrically connected to and receiving said fuel cell current, said fuel cell voltage and said output voltage, said mode controller issuing a mode signal dependent at least in part upon said fuel cell current, said fuel cell voltage and said output voltage.

3. The fuel cell system of claim 2, wherein said power conditioner further comprises control logic, said control logic electrically connected to said mode controller and receiving said mode signal, said control logic decoding and issuing a control signal dependent at least in part upon said mode signal.

4. The fuel cell system of claim 3, wherein said power conditioner further comprises drive circuitry, said drive circuitry electrically connected to said control logic and receiving said control signal, said drive circuitry electrically connected to said power conditioner and issuing thereto a drive signal dependent at least in part upon said control signal.

5. The fuel cell system of claim 4, wherein said power switching device has at least one control terminal electrically connected to and receiving said drive signal.

6. A power conditioner producing an output voltage for use with a fuel cell, said fuel cell generating a fuel cell voltage and a fuel cell current, said power conditioner comprising:
at least one power switching device, said power switching device configured for selectively connecting and disconnecting said output voltage to a plurality of loads dependent at least in part upon an operating temperature of said fuel cell to thereby produce said output voltage to be different in voltage than said fuel cell voltage, wherein when said fuel cell is producing said fuel cell voltage in a start-up mode said power switching device is configured for disallowing substantially all of said fuel cell current from said fuel cell to said plurality of loads when said fuel cell is below said operating temperature.

7. The power conditioner of claim 6, wherein said power conditioner further comprises a mode controller, said mode controller electrically connected to and receiving said fuel cell current, said fuel cell voltage and said output voltage, said mode controller issuing a mode signal dependent at least in part upon said fuel cell current, said fuel cell voltage and said output voltage.

8. The fuel cell system of claim 7, wherein said power conditioner further comprises control logic, said control logic electrically connected to said mode controller and receiving said mode signal, said control logic decoding and issuing a control signal dependent at least in part upon said mode signal.

9. The fuel cell system of claim 8, wherein said power conditioner further comprises drive circuitry, said drive circuitry electrically connected to said control logic and receiving said control signal, said drive circuitry electrically connected to said power switching device and issuing thereto a drive signal dependent at least in part upon said control signal.

10. The fuel cell system of claim 9, wherein said power switching device has at least one control terminal electrically connected to and receiving said drive signal.

11. A fuel cell system having a fuel cell temperature and an operating temperature, the fuel cell system comprising:
a fuel cell unit having a fuel cell stack, said fuel cell stack producing a fuel cell voltage and a fuel cell current; and
a power conditioner electrically connected to said fuel cell unit and producing an output voltage, said power conditioner including a power switching device, said power switching device selectively connecting and disconnecting said output voltage to a plurality of loads dependent at least in part upon said fuel cell temperature to thereby produce an output voltage to be different than said fuel cell voltage,
wherein said power switching device is in a linear mode of operation when said fuel cell temperature has reached said operating temperature and when the difference between said output voltage and said fuel cell voltage is less than 3.0 volts,
wherein said power switching device is in a pulse-width modulated mode of operation when said fuel cell temperature has reached said operating temperature and when the difference between said output voltage and said fuel cell voltage is at least 3.0 volts, and wherein when said fuel cell stack is producing said fuel cell voltage in a start-up mode said power switching device is configured for disallowing substantially all of said fuel cell stack current from said fuel cell stack to said plurality of loads when said fuel cell temperature of said fuel cell is below said operating temperature.

12. The fuel cell system of claim 1, wherein said power switching device is configured for selectively connecting and disconnecting said output voltage to said plurality of loads dependent upon said operating temperature of said fuel cell stack, said fuel cell voltage, and said fuel cell current.

13. The fuel cell system of claim 1, wherein said power switching device comprises one of an integrated gate bipolar transistor or a power metal oxide semiconductor field effect transistor.

14. The power conditioner of claim 6, wherein said power switching device comprises one of an integrated gate bipolar transistor or a power metal oxide semiconductor field effect transistor.

* * * * *